United States Patent
Siddall et al.

[15] 3,694,526
[45] Sept. 26, 1972

[54] HYDROCARBON PHOSPHONATES

[72] Inventors: John B. Siddall, Palo Alto, Calif.; Jean Pierre Calame, Fillanden, Switzerland

[73] Assignee: Zoecon Corporation, Palo Alto, Calif.

[22] Filed: July 14, 1969

[21] Appl. No.: 841,609

Related U.S. Application Data

[63] Continuation-in-part of Ser. No. 800,267, Feb. 18, 1969, which is a continuation-in-part of Ser. No. 618,321, Feb. 24, 1967, abandoned.

[52] U.S. Cl. ............ 260/956, 260/348 R, 260/950, 260/952, 260/953, 260/955, 260/958, 260/961, 260/968, 260/969, 424/203, 424/219, 424/222
[51] Int. Cl. ............................ C07f 9/40, A01n 9/36
[58] Field of Search ........................... 260/956, 961

[56] References Cited

UNITED STATES PATENTS

| | | | |
|---|---|---|---|
| 2,436,141 | 2/1948 | Goebel | 260/961 |
| 2,671,106 | 3/1954 | Albisetti et al. | 260/956 |

FOREIGN PATENTS OR APPLICATIONS

| | | | |
|---|---|---|---|
| 1,139,488 | 11/1962 | Germany | 260/956 |

*Primary Examiner*—Lewis Gotts
*Assistant Examiner*—Anton H. Sutto
*Attorney*—Donald W. Erickson

[57] ABSTRACT

Hydrocarbon phosphonates containing from 12 to 17 carbon atoms in the hydrocarbon backbone chain and lower alkyl substituents at the C-3,7 and 11 positions and unsaturation or saturation between C-2,3, C-6,7 and C-10, 11 and/or substituents at each of positions C-2,3,6,7,10 and 11 which are arthropod maturation inhibitors.

12 Claims, No Drawings

HYDROCARBON PHOSPHONATES

This is a continuation-in-part of application Ser. No. 800,267, filed Feb. 18, 1969 which is a continuation-in-part of application Ser. No. 618,321, filed Feb. 24, 1967, each now abandoned.

The present invention relates to novel organic compounds and to processes for their preparation.

More specifically, the present invention pertains to certain compounds that inhibit maturation of arthropods and to the processes for the preparation of such compounds.

The compounds of the present invention are represented by the following structural formula (A):

$$R^4-\underset{\underset{Z^{11}}{|}}{\overset{\overset{R^3}{|}}{C}}-CH-(CH_2)_2-\underset{\underset{Z^7}{|}}{\overset{\overset{R^2}{|}}{C}}-CH-(CH_2)_2-\underset{\underset{Z^3}{|}}{\overset{\overset{R^1}{|}}{C}}-CH-CH_2-\overset{O}{\underset{}{P}}\overset{OR^{13}}{\underset{OR^{13}}{\diagdown}}$$

(A)

wherein, each of $R^1$, $R^2$, $R^3$ and $R^4$ is lower alkyl;

$Z^2$ is hydrogen or hydroxy and ethers thereof;

$Z^3$ is hydrogen, hydroxy and esters and ethers thereof, bromo, chloro, fluoro, or, when taken together with $Z^2$, is a carbon-carbon double bond between C-2,3 or one of the groups $$\diagdown_O, \quad \diagdown_{CH_2}, \quad \diagdown_{CCl_2} \text{ or } \diagdown_{CF_2}$$

$Z^6$ is hydrogen, hydroxy and esters and ethers thereof, bromo, chloro, or fluoro;

$Z^7$ is hydrogen, hydroxy and esters and ethers thereof, bromo, chloro, fluoro, or, when taken together with $Z^6$, is a carbon-carbon double bond between C-6,7 or one of the groups $$\diagdown_O, \quad \diagdown_{CH_2}, \quad \diagdown_{CCl_2} \text{ or } \diagdown_{CF_2}$$

$Z^{10}$ is hydrogen, hydroxy and esters and ethers thereof, bromo, chloro, or fluoro;

$Z^{11}$ is hydrogen, hydroxy and esters and ethers thereof, bromo, chloro, fluoro, or, when taken together with $Z^{10}$, is a carbon-carbon double bond between C-10,11 or one of the groups $$\diagdown_O, \quad \diagdown_{CH_2}, \quad \diagdown_{CCl_2} \text{ or } \diagdown_{CF_2}$$

and $R^{13}$ is lower alkyl or phenyl, provided that when $Z^3$ is hydrogen — then $Z^2$ is hydrogen.

The chain length of the compounds of the present invention is from 12 carbon atoms (where each of $R^3$ and $R^4$ is methyl) to 17 carbon atoms (where at least one of $R^3$ or $R^4$ is n-hexyl). The C-3 and C-7 carbon atoms are substituted with lower alkyl groups ($R^1$ and $R^2$) and the C-11 carbon atom is substituted with two lower alkyl groups ($R^3$ and $R^4$). In addition, the C-2, C-3, C-6, C-7, C-10 and C-11 carbon atoms, independently, are optionally substituted ($Z^2$, $Z^3$, $Z^6$, $Z^7$, $Z^{10}$ and $Z^{11}$) with groups other than hydrogen.

Each of the pair of carbon atoms C-2,3, C-6,7 and C-10,11 can be linked by a single bond, a double bond or can contain a fused grouping, such as oxido, methylene, dichloro-methylene and difluoromethylene.

Where two adjacent carbon atoms, such as the C-6 and C-7 or C-10 and C-11 carbon atoms are substituted with halide atoms (i.e. $Z^6$ and $Z^7$ or $Z^{10}$ and $Z^{11}$ being halo), the halide atoms are preferably the same.

The term "alkyl" denotes a group comprising a straight or branched chain aliphatic saturated hydrocarbon having a chain length of from one to eight carbon atoms. Typical of such alkyl or methyl, ethyl, isopropyl, propyl, butyl, pentyl, hexyl, octyl, and the like. When qualified by the term "lower", such a group will have a chain length of nor more than six carbon atoms. Typical of such lower alkyl are methyl, ethyl, isopropyl, butyl, isobutyl, pentyl, hexyl, and the like.

The presence of double bonds, epoxide groupings and methylene, difluoromethylene or dichloromethylene groupings gives rise to geometric isomerism in the configuration of these compounds.

This isomerism occurs with regard to the double bond, the epoxide grouping or the unsubstituted or disubstituted methylene grouping bridging the C-2,3 carbon atoms, the C-6,7 atoms and the C-10,11 atoms. Obviously, isomerism at the C-10,11 carbon atoms occurs only when $R^3$ and $R^4$ are different alkyl groups. The isomers are the cis and trans of the monoene series; the cis,cis; cis,trans; trans,cis; and trans,trans of the diene series; and the eight isomers of the triene series; each of which isomers in each series being included within the scope of this invention. Each of these isomers are separable from the reaction mixture by which they are prepared by virtue of their different physical properties via conventional techniques, such as chromatography, including thin-layer and gas-liquid chromatography, as described in more detail hereinafter.

The compounds of this invention are arthropod maturation inhibitors. They possess the ability to inhibit the maturation of members of the phylum Arthropoda, particularly insects, in the passage from one metamorphic stage to the next metamorphic stage. Thus, in the case of insects passing from the embryo stage to the larva stage, thence to the pupa stage and thence to the adult stage, contact with an effective amount of a compound of the present invention, at any of the first three stages, inhibits passage to the next developmental stage with the insect either repeating passage through its present stage or dying. Moreover, these compounds exhibit ovicidal properties with insects and accordingly are useful in combating insects. These compounds are very potent and thus can be used at extremely low levels, e.g. from $10^{-6}$ to $10^{-9}$ g. and are thus advantageously administered over large areas in quantities suitable for the estimated insect population. Generally, the substances are liquids and for the purposes herein described, they can be utilized in conjunction with liquid or solid carriers. Typical insects against which these compounds are effective include mealworm, housefly, bollweevil, cornborer, mosquito, cockroach, moth, and the like.

Although not intending to be limited by any theoretical explanation, it appears that the effectiveness of these derivatives can be traced to their ability to mimic the activity of certain so-called "juvenile hormone" substances such as those described in U.S. Pat. No.

2,981,655 (Williams) and Law et al., Proc. Nat. Acad. Sci., 55, 576 (1966). Because of the potency of the compounds of the present invention, they can be employed in extremely low concentrations, as noted above, to obtained reproducible predetermined level of activities. Juvenile hormone substances have been referred to as growth hormone also. Juvenile hormone was identified as methyl 10,11-oxido-7-ethyl-3,11-trimethyltrideca-2,6-dienoate using an extract of cecropia moths by Roeller et al., Angew. Chem. internat. Edit., 6, 179 (Feb. 1967) and Chemical & Engineering News, 48–49 (April 10, 1967). A second juvenile hormone from the same source has been identified as methyl 10,11-oxido-3,7,11-trimethyl-trideca-2,6-dienoate by Meyer et al., "The Two Juvenile Hormones from the Cecropia Silk Moth", Zoology (Proc. N.A.S.) 60, 853 (1968). In addition to the natural juvenile hormones and the unidentified mixture of Law et al. above, some synthetic terpenoids have been reported to exhibit juvenile hormone activity — Bowers et al., Life Sciences (Oxford) 4, 2323 (1965) — methyl 10,11-oxido-3,7,11-trimethyldodeca-2,6-dienoate; Williams et al., Journal of Insect Physiology 11, 569 (1965); BioScience 18, No. 8, 791 (August 1968); Williams Scientific American 217, No. 1, 13 (July 1967); Science 154, 248 (October 14, 1966); Romanuk et al., Proc. Nat. Acad. Sci. 57, 349 (February 1967) — 7,11-dichloro of esters of farnesoic acid — Canadian Pat. No. 795,805 (1968); Masner et al., Nature 218, 395 (July 27, 1968); and U.S. Pat. No. 3,429,970 — farnesene derivatives.

The compounds of the present invention may be prepared chemically according to a number of alternative routes. One such route is illustrated by the following sequence of reactions:

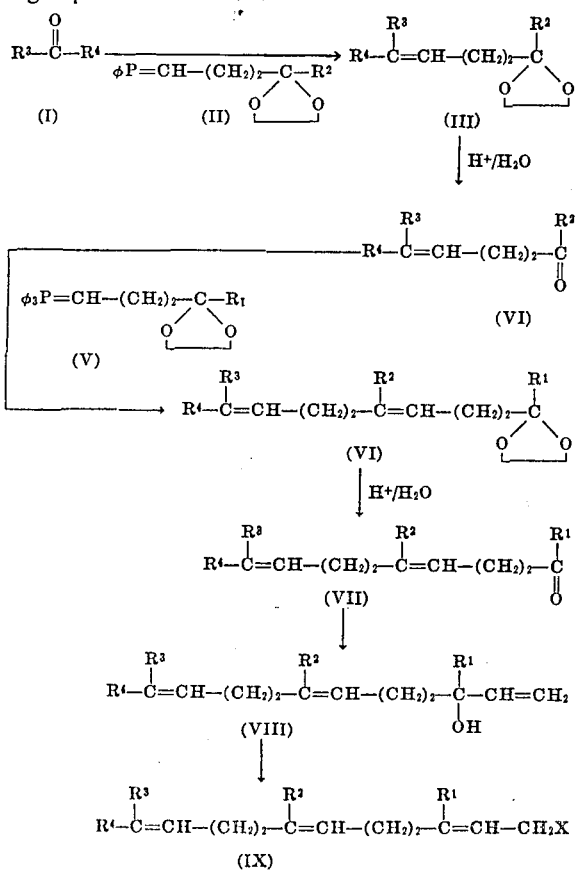

In the above scheme, each of $R^1$, $R^2$, $R^3$ and $R^4$ is as hereinbefore defined, the symbol $\phi$ represents phenyl and X is bromo or chloro.

With reference to the above reaction scheme (I–IX), the selected dialkylketone (I) is reacted with equal molar quantities and, preferably, an excess of the 4-ethylene ketal of the 4-alkylbutylidenetriphenylphosphorane Wittig reagent derivatives (II) in an organic reaction medium, such as is preferably provided by an aprotic solvent with a high dielectric constant, e.g. dimethylsulfoxide, dimethylformamide, and the like, at reflux temperature to afford the corresponding substituted ethylenedioxyalkene Wittig reaction adduct (III). This process thus makes possible the union of hydrocarbon chains with concomitant formation of double bond unsaturation at the juncture.

In the above described process, the 4-ethylene ketal of the 4-alkylbutylidenetriphenylphosphorane Wittig reagent is prepared by conventional procedures, such as is disclosed by Trippett, Advances in Organic Chemistry, Vol. I, pp. 83–102; Trippett, Quarterly Review, Vol. 15–16, pp. 406–410; and Greenwald et al., Journal of Organic Chemistry 28, 1128 (1963) from the 4-ethylene ketal of a 4-alkylbutyl halide (1-halo-4-alkanone) upon treatment thereof with triphenylphosphine and subjecting the resultant phosphonium halide to the action of butyl or phenyl lithium.

The 4-ethylene ketal of the 1-halo-4-alkanone is obtained by subjecting the 4-keto compound to a conventional ketalysis with ethylene glycol in benzene in the presence of an aryl sulfonic acid, such as p-toluenesulfonic acid. The latter 1-halo-4-alkanones, particularly the 1-bromo derivatives are prepared by known processes, such as that described in German Pat. No. 801,276 (Dec. 28, 1950) and by Jager et al., Arch. Pharm. 293, 896 (1960). Briefly, the procedure is to treat butyrolactone with the desired alkyl alkanoate to obtain the corresponding $\alpha$-arylbutyrolactone adduct. Treatment of the latter adduct with an alkali metal halide, particularly sodium bromide, in aqueous sulfuric acid then provides the corresponding 1-bromo-4-alkanone. For example, butyrolactone when treated with ethylacetate gives $\alpha$-acetylbutyrolactone which upon treatment with sodium bromide in aqueous sulfuric acid gives 1-bromo-4-pentanone.

Hydrolysis of the Wittig reaction adduct (III) with aqueous acid affords the free ketone (IV).

By repeating the Wittig reaction just described in the thus-formed ketone (IV), with the Wittig reagent (V) being prepared as already described, the corresponding ethylene ketal diene adduct (VI) is obtained, which is, in turn, hydrolyzed with aqueous acid to the tetraalkyl-substituted nonadienone (VII).

Conversion of the thus-prepared compound (VII) to the 3,7,11-tetra(lower)alkyl-3-hydroxyundeca-1,6,10-triene (VIII) follows upon treatment with vinyl magnesium bromide in an inert, non-aqueous organic solvent, preferably diethyl ether.

The 1-halides represented by formula IX are prepared by treating the corresponding compounds of formula VIII with a phosphorus trihalide, such as phosphorous trichloride or phosphorus tribromide, in a basic solvent, such as pyridine or triethylamine.

The phosphonates of the present invention can be prepared from the 1-halide compounds of formula IX by the route illustrated by the following reaction sequence:

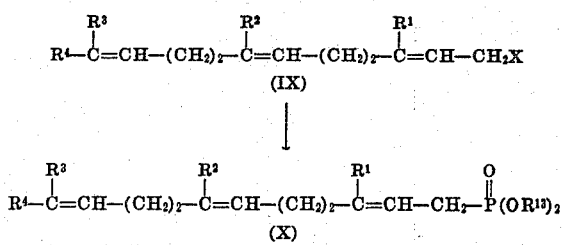

(IX)

↓

(X)

The 1-halide compounds of formula IX, especially preferred are the 1-bromo compounds, are treated with a tri-substituted phosphite, such as trimethyl phosphite, triethyl phosphite, tripropyl phosphite, triphenyl phosphite, and the like, in an inert organic solvent, such as benzene, xylene, and the like, at temperatures of about 100° C or higher.

Hydrogenation of one or more of the double bonds to the corresponding saturated (carbon-carbon single bond) linkage ($Z^2=Z^3=H$, $Z^6=Z^7=H$, $Z^{10}=Z^{11}=H$) is conveniently performed in benzene over a 5% palladium catalyst on carbon or barium sulfate support, halogen groups being later restored as described below, if necessary.

The novel compounds of the present invention embraced by the term "hydrocarbon phosphonates" and by formula A above are represented by the following formulas

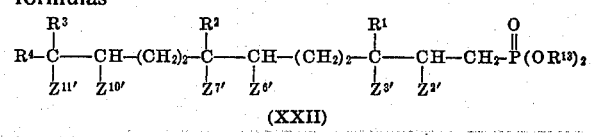

(XXII)

in which, $Z^2$ is hydrogen; $Z^3$ is hydrogen, or, when taken together with $Z^2$, is a carbon-carbon double bond between C-2,3; $Z^6$ is hydrogen; $Z^7$ is hydrogen, or, when taken together with $Z^6$, is a carbon-carbon double bond between C-6,7; $Z^{10}$ is hydrogen; and $Z^{11}$ is hydrogen, or, when taken together with $Z^{10}$, is a carbon-carbon double bond between C-10,11.

Separation of the various geometric isomers can be performed at any appropriate or convenient point in the overall process. An advantageous and particular synthetically valuable point at which to separate isomers by chromatography, and the like, is at the conclusion of each step of the backbone synthesis, that is, after preparing each of the compounds represented by formulas III, VI, VIII, IX, and X.

The following examples will serve to further typify the nature of this invention. As these are presented solely for the purpose of illustration, they should not be construed as a limitation on the scope of this invention.

In some instances, for convenience, the various isomeric forms are specified; however, the carbon-carbon double bonds, epoxide, methylene, difluoromethylene or dichloromethylene groupings can be cis or trans geometric isomers independent of each other and in fact isomeric mixtures are frequently employed in the described reactions.

EXAMPLE 1

A. To a solution of 20.9 g. of ethylene ketal of 1-bromo-4-pentanone (obtained by treating 1-bromo-4pentanone with ethylene glycol in benzene in the presence of p-toluenesulfonic acid) in 100 ml. of benzene is added 20 g. of triphenylphosphine. This mixture is heated at reflux temperature for two hours and then filtered. The solid material thus-collected is washed with benzene, dried in vacuo and added to 6.49 g. of butyl lithium in 50 ml. of dimethylsulfoxide. This mixture is stirred until an orange solution is obtained and 3.8 g. of methyl ethyl ketone is then added. This mixture is stirred at about 25° C for about eight hours, poured into water and this mixture is extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate, they are evaporated to yield a mixture of the cis and trans isomers of 6-methyl-5-octen-2-one which is separated by preparative gas-liquid chromatography into the individual isomers.

B. To a solution of 20.9 g. of the ethylene ketal of 1-bromo-4-pentanone in 100 ml. of benzene is added 20 g. of triphenylphosphine. This mixture is heated at reflux temperature for two hours and then filtered. The solid material thus collected is washed with benzene, dried in vacuo and added to 6.49 g. of butyl lithium in 50 ml. of dimethylsulfoxide. This mixture is stirred until an orange solution is obtained and 5.5 g. of trans 6-methyl-5-octen-2-one (the ketone obtained in Part A) is then added. This mixture is stirred at about 25° C for about eight hours, poured into water, and this mixture is extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate, they are evaporated to furnish a mixture of the trans,trans and cis,trans isomers of 6,10-dimethyldodeca-5,9-dien-2-one which is separated by preparative gas-liquid chromatography to the individual isomers.

By repeating the above procedure with the exception of using cis 6-methyl-5-octen-2-one in place of trans 6-methyl-5-octen-2-one, there is obtained a mixture of the cis,cis and trans,cis isomers of 6,10-dimethyldodeca-5,9-dien-2-one which is separated as described above.

Similarly, in the above procedure, instead of using either the trans or cis isomers of 6-methyl-5-octen-2-one as the starting material, there can be used a mixture of the isomers obtained in Part A in which case a mixture of the four isomers is obtained which can then be separated by preparative gas-liquid chromatography into the four isomers.

C. To a solution of 21.0 g. of 6,10-dimethyldodec-5,9-dien-2-one and 250 ml. of dry ethyl acetate, 500 ml. of (4%) reduced palladium-on-barium sulfate are added. The resulting mixture is hydrogenated at room temperature until 0.10 moles of gaseous hydrogen have been taken up. The mixture is filtered over a bed of diatomaceous earth and the filtrate is added to 500 ml. of benzene, washed with four 150 ml. portions of water, dried over sodium sulfate and evaporated to dryness under reduced pressure to predominately yield the desired 6,10-dimethyldodec-5-en-2-one which is purified by preparative scale gas-liquid chromatography.

EXAMPLE 2

A. A solution of 6,10-dimethyldodeca-5,9-dien-2-one, prepared by the process of Parts A and B of Example 1, (21 g., 0.1 moles) and dry diethyl ether (100 ml.) is added slowly to a suspension of vinyl magnesium bromide (13.1 g., 0.1 moles) in dry diethyl ether. The addition is performed at −20° C. At the completion of the addition, the reaction mixture is allowed to attain room temperature; then the mixture is refluxed for one hour. The mixture is added to an ice cold aqueous ammonia chloride solution; the mixture is extracted with methylene chloride. The extracts are combined, dried over sodium sulfate and evaporated under reduced pressure to yield 3,7,11-trimethyltrideca-1,6,10-trien-3-ol.

Similarly, 3,7,11-trimethyltrideca-1,6-diene-3al is prepared by the method of the above process by using 6,10-dimethyldodec-5-en-2-one as starting material.

EXAMPLE 3

A. Phosphorus trichloride (13.7 g.) is carefully added to a mixture of 3,7,11-trimethyltrideca-1,6,10-trien-3-ol, prepared in the manner described in Part A of Example 7, (23.7 g.) and pyridine (200 ml.). The addition is carried out at −15° C with stirring. After the completion of the addition, the mixture is stirred for an additional four hours at −15° C. Ice (100 g.) is added followed by diethyl ether (200 ml.). The resulting mixture is washed with water to neutrality, dried over sodium sulfate and evaporated to dryness to yield 1-chloro-3,7,11-trimethyltrideca-2,6,10-triene.

B. By repeating the procedures of Parts A and B of Example 1, the procedure of Part A of Example 2 and the procedure of Part A of this example with the exceptions that in Part A of Example 1 2-butanone (methyl ethyl ketone) is optionally replaced with the ketones listed in Column I and the ketone thus obtained in Part A is used in place of 6-methyl-5-octen-2-one in Part B of Example 1, there is obtained the halides listed in Column II.

| I | II |
|---|---|
| ethyl i-propyl ketone | 1-chloro-3,7,12-trimethyl-11-ethyltrideca-2,6,10-triene |
| methyl n-amyl ketone | 1-chloro-3,7,11-trimethyl-hexadeca-2,6,10-triene |
| ethyl n-butyl ketone | 1-chloro-3,7-dimethyl-11-ethylpentadeca-2,6,10-triene |
| 3-ethyl-2-pentanone | 1-chloro-3,7,11-trimethyl-12-ethyltetradeca-2,6,10-triene |
| diisopropyl ketone | 1-chloro-3,7,12-trimethyl-11-(i-propyl)-trideca-2,6,10-triene |
| methyl n-hexyl ketone | 1-chloro-3,7,11-trimethyl-heptadeca-2,6,10-triene |
| 5-ethyl-3-heptanone | 1-chloro-3,7-dimethyl-11,13-diethylpentadeca-2,6,10-triene |
| 4-decanone | 1-chloro-3,7-dimethyl-11-(n-propyl)-heptadeca-2,6,10-triene |
| di-n-amyl ketone | 1-chloro-3,7-dimethyl-11-(n-amyl)-hexadeca-2,6,10-triene |
| di-n-hexyl ketone | 1-chloro-3,7-dimethyl-11-(n-hexyl)-heptadeca-2,6,10-triene |
| acetone | 1-chloro-3,7,11-trimethyl-dodeca-2,6,10-triene |
| methyl n-propyl ketone | 1-chloro-3,7,11-trimethyl-tetradeca-2,6,10-triene |
| diethyl ketone | 1-chloro-3,7-dimethyl-11-ethyltrideca-2,6,10-triene |
| methyl i-propyl ketone | 1-chloro-3,7,11,12-tetra-methyltrideca-2,6,10-triene |
| methyl n-butyl ketone | 1-chloro-3,7,11-trimethyl-pentadeca-2,6,10-triene |
| ethyl n-propyl ketone | 1-chloro-3,7-dimethyl-11-ethyltetradeca-2,6,10-triene |
| methyl t-butyl ketone | 1-chloro-3,7,11,12,12-pentamethyltrideca-2,6,10-triene |
| methyl i-butyl ketone | 1-chloro-3,7,11,13-tetra-methyltetradeca-2,6,10-triene |
| methyl s-butyl ketone | 1-chloro-3,7,11,12-tetra-methyltetradeca-2,6,10-triene |

C. The procedures of Parts A and B of Example 1, the procedure of Part A of Example 2 and the procedure of Part A of the present example is repeated with the exception that in Part A of Example 1, 1-bromo-4-pentanone is replaced with the 1-bromo-4-ketones listed in Column III to furnish the halides listed in Column IV.

| III | IV |
|---|---|
| 1-bromo-4-hexanone | 1-chloro-3,11-dimethyl-7-ethyltrideca-2,6,10-triene |
| 1-bromo-4-heptanone | 1-chloro-3,11-dimethyl-7-(n-propyl)-trideca-2,6,10-triene |
| 1-bromo-4-octanone | 1-chloro-3,11-dimethyl-7-(n-butyl)-trideca-2,6,10-triene |
| 1-bromo-4-nonanone | 1-chloro-3,11-dimethyl-7-(n-amyl)-trideca-2,6,10-triene |
| 1-bromo-5-methyl-4-hexanone | 1-chloro-3,11-dimethyl-7-(i-propyl)-trideca-2,6,10-triene |
| 1-bromo-6-methyl-4-heptanone | 1-chloro-3,11-dimethyl-7-(i-butyl)-trideca-2,6,10-triene |
| 1-bromo-5,5-dimethyl-4-hexanone | 1-chloro-3,11-dimethyl-7-(t-butyl)-trideca-2,6,10-triene |

Similarly, by repeating the procedure of Part B of the present example using the 1-bromo-4-ketones listed in Column III in place of the 1-bromo-4-pentanone employed in Part A of Example 1, there is obtained 1-chloro-3,12-dimethyl-7,11-diethyltrideca-2,6,10-triene, 1-chloro-3,12-dimethyl-7-(n-propyl)-11-ethyltrideca-2,6,10-triene, 1-chloro-3,12-dimethyl-7-(n-butyl)-11-ethyltrideca-2,6,10-triene, 1-chloro-3,12-dimethyl-7-(n-amyl)-11-ethyltrideca-2,6,10-triene, 1-chloro-3,12-dimethyl-7-(i-propyl)-11-ethyltrideca-2,6,10-triene, 1-chloro-3,12-dimethyl-7-(i-butyl)-11-ethyltrideca-2,6,10-triene, 1-chloro-3,12-dimethyl-7-(t-butyl)-11-ethyltrideca-2,6,10-triene, 1-chloro-3,11-dimethyl-7-ethylhexadeca-2,6,10-triene, 1-chloro-3,11-dimethyl-7-(n-propyl)-hexadeca-2,6,10-triene, 1-chloro-3,11-dimethyl-7-(n-butyl)-hexadeca-2,6,10-triene, and the like.

D. The procedures of Parts A and B of Example 1, the procedures of Part A of Example 2 and the procedure of Part A of this example are repeated with the exception that in Part B of Example 1, 1-bromo-4-pentanone is replaced with the 1-bromo-4-ketones listed in Column III furnishing the following halides: 1-chloro 7,11-dimethyl-3-ethyltrideca-2,6,10-triene, 1-chloro 7,11-dimethyl-3-(n-propyl)-trideca-2,6,10-triene, 1-chloro 7,11-dimethyl-3-(n-butyl)-trideca-2,6,10-triene, 1-chloro 7,11-dimethyl-3(n-amyl)-trideca-2,6,10-triene, 1-chloro 7,11-dimethyl-3-(i-propyl)-trideca-2,6,10-triene, 1-chloro 7,11-dimethyl-3-(i-butyl)-trideca-2,6,10-triene and 1chloro 7,11-dimethyl-3-(t-butyl)-trideca-2,6,10-triene.

Similarly, by repeating the procedure of Part B of the present example with the exception that in Part B of Example 1, the 1-bromo-4-ketones listed in Column III are used in place of 1-bromo-4-pentanone, there is obtained:

1-chloro 7,11-dimethyl-3-ethyldodeca-2,6,10-triene, 1-chloro 7,11-dimethyl-3-(n-propyl)-dodeca-2,6,10-triene,
1-chloro 7,11-dimethyl-3-(n-butyl)-dodeca-2,6,10-triene,
1-chloro 7,11-dimethyl-3-(n-amyl)-dodeca-2,6,10-triene,
1-chloro 7,11-dimethyl-3-(i-propyl)-dodeca-2,6,10-triene,
1-chloro 7,11-dimethyl-3-(i-butyl)-dodeca-2,6,10-triene,
1-chloro 7,11-dimethyl-3-(t-butyl)-dodeca-2,6,10-triene,
1-chloro-7,11-dimethyl-3-ethyltetradeca-2,6,10-triene,
1-chloro 3,11-diethyl-7-methyltrideca-2,6,10-triene,
1-chloro 3-ethyl-7,11,12-trimethyltrideca-2,6,10-triene,
1-chloro 7,11-dimethyl-3-ethylpentadeca-2,6,10-triene,
1-chloro 3,11-diethyl-7-methyltetradeca-2,6,10-triene,
1-chloro 3-ethyl-7,11,12,12-tetramethyltrideca-2,6,10-triene,
1-chloro 3-ethyl-7,11,13-trimethyltetradeca-2,6,10-triene,
1-chloro 3-ethyl-7,11,12-trimethyltetradeca-2,6,10-triene,
1-chloro 3,11-diethyl-7,12-dimethyltrideca-2,6,10-triene,
1-chloro 3-ethyl-7,11-dimethylhexadeca-2,6,10-triene,
1-chloro 3,11-diethyl-7-methylpentadeca-2,6,10-triene,
1-chloro 3,11,12-triethyl-7-methyltetradeca-2,6,10-triene,
1-chloro 3-ethyl-7,12-dimethyl-11-(i-propyl)-trideca-2,6,10-triene,
1-chloro 7,11-dimethyl-3-ethylheptadeca-2,6,10-triene,
1-chloro 7-methyl-3,11,13-triethyltetradeca-2,6,10-triene,
1-chloro 3-ethyl-7-methyl-11-(n-propyl)-heptadeca-2,6,10-triene,
1-chloro 3-ethyl-7-methyl-11-(n-amyl)-hexadeca-2,6,10-triene,
1-chloro 3-ethyl-7-methyl-11-(n-hexyl)-heptadeca-2,6,10-triene, and the like.

Likewise, by repeating the procedure of Part C of the present example with the exception that in Part B of Example 1, 1-bromo-4-pentanone is replaced with the 1-bromo-4-ketones listed in Column III, there is obtained:

1-chloro 3,7-diethyl-11-methyltrideca-2,6,10-triene,
1-chloro 7-ethyl-11-methyl-3-(n-propyl)-trideca-2,6,10-triene,
1-chloro 7ethyl-11-methyl-3-(n-butyl)-trideca-2,6,10-triene,
1-chloro 7-ethyl-11-methyl-3-(n-amyl)-trideca-2,6,10-triene,
1-chloro 7-ethyl-3-(i-propyl)-11-methyltrideca-2,6,10-triene,
1-chloro 7-ethyl-3-(i-butyl)-11-methyltrideca-2,6,10-triene,
1-chloro 7-ethyl-11-methyl-3-(t-butyl)-trideca-2,6,10-triene,
1-chloro 3-ethyl-11-methyl-7-(n-propyl)-trideca-2,6,10-triene,
1-chloro 3-ethyl-11-methyl-7-(n-butyl)-trideca-2,6,10-triene,
1-chloro 3-ethyl-11-methyl-7-(n-amyl)-trideca-2,6,10-triene,
1-chloro 3-ethyl-7-(i-propyl)-11-,ethyltrideca-2,6,10-triene,
1-chloro 3-ethyl-7-(i-butyl)-11-methyltrideca-2,6,10-triene,
1-chloro 3-ethyl-11-methyl-7-(t-butyl)-trideca-2,6,10-triene,
1-chloro 3,7-diethyl-11-methyldodeca-2,6,10-triene,
1-chloro 3-ethyl-11-methyl-7-(n-propyl)-dodeca-2,6,10-triene,
1-chloro 3-ethyl-11-methyl-7-(n-butyl)-dodeca-2,6,10-triene,
1-chloro 3-ethyl-11-methyl-7-(n-amyl)-dodeca-2,6,10-triene,
1-chloro 3-ethyl-7-(i-propyl)-11-methyldodeca-2,6,10-triene,
1-chloro 3-ethyl-7-(i-butyl)-11-methyldodeca-2,6,10-triene,
1-chloro 3-ethyl-11-methyl-7-(t-butyl)-dodeca-2,6,10-triene,
1-chloro 3,11-diethyl-11-methyl-tetradeca-2,6,10-triene,
1-chloro 3-ethyl-11-methyl-7-(n-propyl)-tetradeca-2,6,10-triene,
1-chloro 3-ethyl-11-methyl-7-(n-butyl)-tetradeca-2,6,10-triene, and so forth.

E. The procedure of Parts A and B of Example 1, the procedure of Part A of Example 2 and the procedure of Part A of the present example are repeated with the exception that phosphorus trichloride is replaced with phosphorus tribromide to furnish the corresponding 1-bromo-3,7,11-tri-methyltrideca-2,6,10-triene.

Similarly, by repeating the procedures of Parts B, C and D of the present example, with the exception that phosphorus trichloride is replaced with phosphorus tribromide, the corresponding 1-bromo compounds are obtained.

EXAMPLE 4

A mixture of 29.9 g. of 1-bromo-3,7,11-trimethyl-trideca-2,6,10-triene, prepared by the processes of Example 3, 300 ml. of xylene and 100 g. of triethyl phosphite is refluxed with a nitrogen atmosphere for one hour. The cooled mixture is washed with 1 N hydrochloric acid and then with water to neutrality. The mixture is dried over sodium sulfate and evaporated to dryness under vacuum to yield diethyl 3,7,11-trimethyltrideca-2,6,10-trienyl phosphonate, which is isolated by column chromatography.

Similarly, diethyl 3,7,11-trimethyldodeca-2,6,10-trienyl phosphonate and diethyl 3,11-dimethyl-7-ethyl-trideca-2,6,10-trienyl phosphonate are prepared by replacing 1-bromo-3,7,11-trimethyltrideca-2,6,10-triene in the above process with 1-bromo-3,7,11-trimethyldodeca-2,6,10-triene and 1-bromo-3,11-dimethyl-7-ethyltrideca-2,6,10-triene which are prepared by the processes described in Example 3.

By the above process, dimethyl 3,7,11-trimethyl-trideca-2,6,10-trienyl phosphonate, dipropyl 3,7,11-trimethyltrideca-2,6,10-trienyl phosphonate and diphenyl 3,7,11-trimethyltrideca-2,6,10-trienyl phosphonate are prepared by replacing triethyl phosphite with trimethyl phosphite, tripropyl phosphite, and triphenyl phosphite, respectively.

EXAMPLE 5

One gram of diethyl 3,7,11-trimethyltrideca-2,6,10-trienyl phosphonate in 50ml. of benzene is hydrogenated with one molar equivalent of hydrogen using 0.3 g. of 5% palladium-on-charcoal catalyst at atmospheric pressure and room temperature. The catalyst is then removed by filtration and the filtrate evaporated to yield a mixture of diethyl 3,7,11-trimethyltrideca-2,6-dienyl phosphonate and diethyl 3,7,11-trimethyltrideca-2,10-dienyl phosphonate. The compounds are separated by gas-liquid chromatography.

Upon repeating the above procedure with the exception that the hydrogenation is accomplished with two molar equivalents of hydrogen, diethyl 3,7,11-trimethyltridec-2-enyl phosphonate is obtained.

Similarly, the 2,6-diene, 2,10-diene and 2-ene derivatives of the following compounds are prepared: diethyl 3,7,11-trimethyldodeca-2,6,10-trienyl phosphonate, dimethyl 3,7,11-trimethyltrideca-2,6,10-trienyl phosphonate, diethyl 3,11-dimethyl-7-ethyl-trideca-2,6,10-trienyl phosphonate and dimethyl 3,7,11-tripentylheptadeca-2,6,10-trienyl phosphonate.

By the above procedure, the monoene, diene and triene products of Examples 2, 3 and 4 are hydrogenated.

EXAMPLE 6

A. To a solution of 20.9 g. of the ethylene ketal of 1-bromo-4-hexanone (obtained by treating 1-bromo-4-hexanone with ethylene glycol in benzene in the presence of p-toluene-sulfonic acid) in 100 ml. of benzene is added 20 g. of triphenylphosphine. This mixture is heated at reflux temperature for two hours and then filtered. The solid material thus collected is washed with benzene, dried in vacuo and added to 6.49 g. of butyl lithium in 50 ml. of dimethylsulfoxide. This mixture is stirred until an orange solution is obtained and 3.8 g. of methyl ethyl ketone is then added. This mixture is stirred at about 25° C for about 8 hours, poured into water, and this mixture is extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate they are evaporated to yield 7-methylnon-6-en-3-one.

The above process is repeated using each of acetone and diethyl ketone in place of methyl ethyl ketone to yield 7-methyloct-6-en-3-one and 7-ethylnon-6-en-3-one.

By repeating the above process using 1-bromo-4-pentanone and acetone in place of 1-bromo-4-hexanone and methyl ethyl ketone, respectively, there is obtained 6-methylhept-5-en-2-one.

B. To a solution of 20.9 g. of the ethylene ketal of 1-bromo-4-hexanone in 100 ml. of benzene is added 20 g. of triphenylphosphine. This mixture is heated at reflux temperature for two hours and then filtered. The solid material thus collected is washed with benzene, dried in vacuo and added 6.49 g. of butyl lithium in 50 ml. of dimethylsulfoxide. This mixture is stirred until an orange solution is obtained and 5.5 g. of 7-methylnon-6-en-3-one (the ketone obtained in Part A) is then added. This mixture is stirred at about 25° C for about eight hours, poured into water and this mixture is extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate, they are evaporated to furnish 7-ethyl-11-methyltrideca-6,10-dien-3-one.

By using each of 7-methyloct-6-en-3-one and 7-ethyl-non-6-en-3-one in place of 7-methylnon-6-en-3-one in the above process, there is obtained 7-ethyl-11-methyldodeca-6,10-diene-3-one and 7,11-diethyl-trideca-6,10-diene-3-one, respectively.

C. The process of Example 1B is repeated with the exception of using each of 6-methylhept-5-en-2-one, 7-methyl-non-6-en-3-one, 7-methyloct-6-en-3-one and 7-ethylnon-6-en-3-one in place of 6-methyloct-5-en-2-one to yield 6,10-dimethyl-undeca-5,9-dien-2-one, 6-ethyl-10-methyldodeca-5,9-dien-2-one, 6-ethyl-10-methylundeca-5,9-diene-2-one and 6,10-diethyl-dodeca-5,9-diene-2-one, respectively.

D. A suspension of 0.5 g. of 5% palladium-on-carbon catalyst in 50 ml. of benzene is hydrogenated for 30 minutes. A solution of 2 g. of 7-ethyl-11-methyltrideca-6,10-diene-3-one in 100 ml. of benzene is added and hydrogenated with agitation until the theoretical amount of hydrogen has been absorbed. The catalyst is thereafter removed by filtration and the solution is evaporated to yield 7-ethyl-11-methyltridec-10-en-3-one, 7-ethyl-11-methyltridec-6-en-3-one and 7-ethyl-11-methyltridecan-3-one which are separated by preparative gas-liquid chromatography.

By use of the foregoing procedure, each of 7-ethyl-11-methyldodeca-6,10-dien-3-one, 7,11-diethyl-trideca-6,10-dien-3-one, 6,10-dimethylundeca-5,9-dien-2-one, 6-ethyl-10-methyldodeca-5,9-dien-2-one, 6-ethyl-10-methylundeca-5,9-dien-2-one and 6,10-diethyldodeca-5,9-dien-2-one is hydrogenated to the corresponding dihydro derivatives and tetrahydro derivative.

EXAMPLE 7

A. A solution of 3 g. of 7-ethyl-11-methyltridec-10-en-3-one and dry diethyl ether (50ml.) is added slowly to a suspension of one molar equivalent of vinyl magnesium bromide in dry diethyl ether. The addition is performed at −20° C. At the completion of the addition, the reaction mixture is allowed to attain room temperature and then the mixture is added to an ice cold aqueous ammonium chloride solution and then extracted with methylene chloride. The extracts are combined, dried over sodium sulfate and evaporated under reduced pressure to yield 3,7-diethyl-11-methyltrideca-1,10-dien-3-ol.

By using each of 7-ethyl-11-methyldodecan-3-one, 7,11-diethyltridec-6-en-3-one, 6,10-dimethylundec-9-en-2-one, 6,10-dimethylundec-5-en-2-one, 6,10- dimethylundecan-2-one, 6-ethyl-10-methyldodec-9-en-2-one, 6-ethyl-10-methyldodecan-2-one, 6-ethyl-10-methylundec-9-en-2-one, 6-ethyl-10-methylundecan-2-one and 6,10-diethyldodec-9-en-2-one in the foregoing process in place of 7-ethyl-11-methyltridec-10-en-3-one, there is obtained 3,7-diethyl-11-methyldodec-1-en-3-ol, 3,7,11-triethyltrideca-1,6-dien-3-ol, 3,7,11-trimethyldodeca-1,10-dien-3-ol, 3,7,11-trimethyldodeca-1,6-dien-3-ol, 3,7,11-trimethyldodec-1-en-3-ol, 3,11-dimethyl-7-ethyltrideca-1,10-dien-3-ol, 3,11-dimethyl-7-ethyltridec-1-en-3-ol, 3,11-dimethyl-7-ethyldodeca-1,10-dien-3-ol, 3,11-dimethyl-7-ethyldodec-1-en-3-ol and 3-methyl-7,11-diethyltrideca-1,10-dien-3-ol, respectively.

Similarly, the other products of Example 6D are converted into the corresponding monoene 3-hydroxy and diene 3-hydroxy compounds.

B. Each of the products of Part A is reacted with phosphorus trichloride and phosphorus tribromide using the procedure of Example 8 to afford the C-1 chloride and C-1 bromide. For example, using phosphorus tribromide, there is obtained 1-bromo-3,7-diethyl-11-methyltrideca-2,10-diene, 1-bromo-3,7-diethyl-11-methyldodec-2-ene, 1-bromo-3,7,11-triethyltrideca-2,6-diene, 1-bromo-3,7,11-trimethyldodeca-2,10-diene, 1-bromo-3,7,11-trimethyldodeca-2,6-diene, 1-bromo-3,7,11-trimethyldodec-2-ene, 1-bromo-3,11-dimethyl-7-ethyltrideca-2,10-diene, 1-bromo-3,11-dimethyl-7-ethyltridec-2-ene, 1-bromo-3,11-dimethyl-7-ethyldodeca-2,10-diene, 1-bromo-3,11-dimethyl-7-ethyldodec-2-ene and 1-bromo-3-methyl-7,11-diethyltrideca-2,10-diene, respectively.

Each of the foregoing C-1 bromides is used as the starting material in the process of Example 4 to yield diethyl 3,7-diethyl-11-methyltrideca-2,10-dienyl phosphonate, diethyl 3,7-diethyl-11-methyldodec-2-enyl phosphonate, diethyl 3,7,11-triethyltrideca-2,6-dienyl phosphonate, diethyl 3,7,11-trimethyldodeca-2,10-dienyl phosphonate, diethyl 3,7,11-trimethyldodeca-2,6-dienyl phosphonate, diethyl 3,7,11-trimethyldodec-2-enyl phosphonate, diethyl 3,11-dimethyl-7-ethyltrideca-2,10dienyl, phosphonate, diethyl 3,11-dimethyl-7-ethyltridec-2-enyl phosphonate, diethyl 3,11-dimethyl-7-ethyldodeca-2,10-dienyl phosphonate, diethyl 3,11-dimethyl-7-ethyldodec-2-enyl phosphonate and diethyl 3-methyl-7,11-diethyltrideca-2,10-dienyl phosphonate, respectively.

What is claimed is:
1. A compound having the formula XXII:

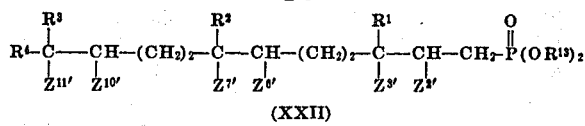

(XXII)

in which each of $R^1$, $R^2$, $R^3$, and $R^4$ is lower alkyl; $Z^{2'}$ is hydrogen; $Z^{3'}$ is hydrogen, or, when taken together with $Z^{2'}$, is a carbon-carbon double bond between C-2,3; $Z^{6'}$ is hydrogen; $Z^{7'}$ is hydrogen, or, when taken together with $Z^{6'}$, is a carbon-carbon double bond between C-6,7; $Z^{10'}$ is hydrogen; and $Z^{11'}$ is hydrogen, or, when taken together with $Z^{10'}$, is a carbon-carbon double bond between C-10,11; and $R^{13}$ is lower alkyl or phenyl.

2. A compound according to claim 1 wherein $Z^{3'}$ taken together with $Z^{2'}$ is a carbon-carbon double bond between C-2,3.

3. A compound according to claim 2 wherein $R^2$ is ethyl.

4. A compound according to claim 1 wherein each of $R^2$ and $R^3$ is ethyl; each or $R^1$ and $R^4$ is methyl and $Z^{3'}$ taken together with $Z^{2'}$ is a carbon-carbon double bond between C-2,3.

5. A compound according to claim 2 wherein at least one of $R^2$ and $R^3$ is ethyl.

6. A compound according to claim 2 wherein at least one of $R^2$ and $R^3$ is ethyl; $Z^{7'}$ taken together with $Z^{6'}$ is a carbon-carbon double bond between C-6,7 and $Z^{11'}$ Taken together with $Z^{10'}$ is a carbon-carbon double bond between C-10,11.

7. A compound according to claim 1 wherein each of $R^1$, $R^2$, $R^3$ and $R^4$ is methyl or ethyl and $Z^{3'}$ taken together with $Z^{2'}$ is a carbon-carbon double bond.

8. A compound according to claim 7 wherein $Z^{7'}$ taken together with $Z^{6'}$ is a carbon-carbon double bond.

9. A compound according to claim 7 wherein $Z^{11'}$ taken together with $Z^{10'}$ is a carbon-carbon double bond.

10. A compound according to claim 7 wherein $R^{13}$ is ethyl.

11. A compound according to claim 9 wherein each of $Z^{6'}$ and $Z^{7'}$ is hydrogen.

12. A compound according to claim 8 wherein each of $R^1$, $R^2$ and $R^4$ is methyl; each of $R^3$ and $R^{13}$ is ethyl; and $Z^{11'}$ taken together with $Z^{10'}$ is a carbon-carbon double bond.

* * * * *